Figure 1:
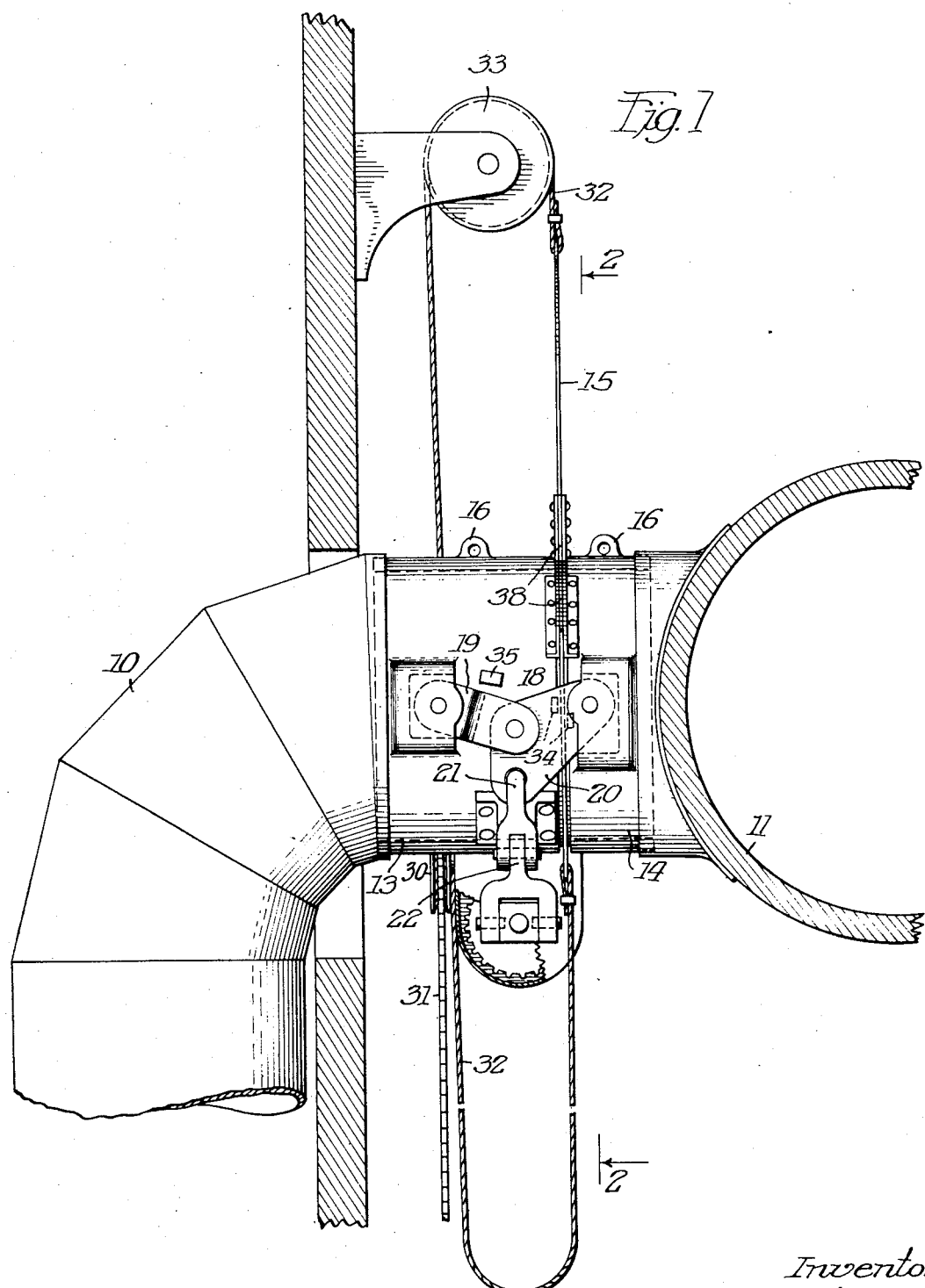

G. D. BRADSHAW.
GAS VALVE.
APPLICATION FILED APR. 28, 1919.

1,342,620.

Patented June 8, 1920.
2 SHEETS—SHEET 1.

Witness:
L. W. Novander

Inventor:
Grant D. Bradshaw,
By E. J. Andrews
atty.

G. D. BRADSHAW.
GAS VALVE.
APPLICATION FILED APR. 28, 1919.
1,342,620.
Patented June 8, 1920.
2 SHEETS—SHEET 2.
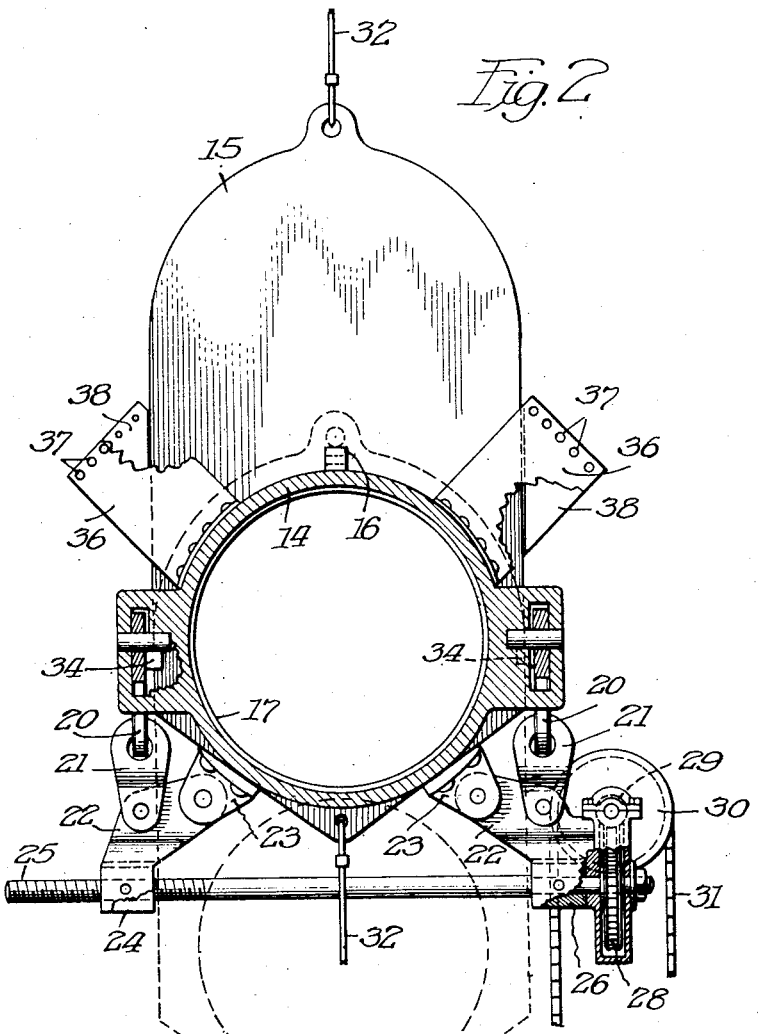
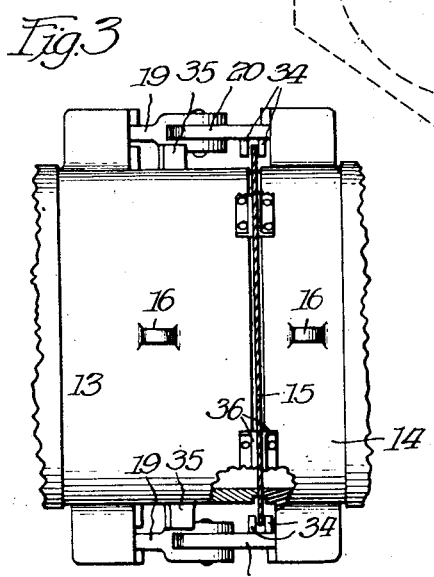
Witness:
L. W. Novander
Inventor:
Grant D. Bradshaw,
By E. J. Andrews
atty.

UNITED STATES PATENT OFFICE.

GRANT D. BRADSHAW, OF PITTSBURGH, PENNSYLVANIA.

GAS-VALVE.

1,342,620.　　　　　Specification of Letters Patent.　　Patented June 8, 1920.

Application filed April 28, 1919. Serial No. 293,258.

*To all whom it may concern:*

Be it known that I, GRANT D. BRADSHAW, a citizen of the United States, residing at Pittsburgh, in the county of Allegheny and State of Pennsylvania, have invented certain new and useful Improvements in Gas-Valves, of which the following is a specification.

This invention relates to gas valves, and particularly to that type of gas valves which are called in the trade spectacle or goggle valves and which are used in controlling the flow of gas through large pipes, particularly where the opening or closing of the valve occurs only at rare intervals. The object of the invention is to provide a valve and means for operating the same by which the valve can be conveniently and quickly closed or opened and at the same time, will be inexpensive and effective. Other objects of the invention will be apparent by a consideration of the accompanying drawings and the following description thereof.

Of the drawings Figure 1 is an elevation of a valve and the operating means therefor which embody features of my invention. Fig. 2 is a section along the line 2—2 of Fig. 1. Fig. 3 is a plan view of the valve and the mechanism therefor.

The valve is inserted in large gas mains where it is desired to open and close the main at times for repairs, changes, or the like. In this instance I show the valve inserted in the branch pipe 10 leading from the main 11. The valve proper comprises a cylindrical sleeve 13 fixed to the pipe 10, a sleeve 14 fixed to the pipe 11, and a valve plate 15 which is positioned between the adjacent ends of the two sleeves; the sleeves being supported in any suitable manner as by means of the lugs 16, so that the bore of the sleeves register. The valve plate 15 has an opening 17 in its lower end so that when the plate is elevated, as indicated in the drawings, the gas is free to pass through the sleeves; but when the plate is lowered, as indicated by the dotted lines in Fig. 2, the valve is closed by the plate.

The use of sleeves and a plate, as hereinabove described is old; it being common to hold the sleeves firmly against the plate by means of bolts passing through flanges fixed to the sleeves; and in order to shift the valve plate, the bolts are loosened. My invention consists partly in providing improved means for holding the sleeves against the plate and for separating the sleeves when it is desired to shift the plate. These means comprise the toggle joint 18 consisting of a link 19 pivoted to the sleeve 13 and lever 20, pivoted to the sleeve 14 and also the free end of the link 19; the lengths of the link and the lever and the positions of the pivots, are such that by pushing upwardly on the lever 20 the sleeves will be separated sufficiently to allow the plate 15 to be freely shifted. At the same time by pulling downwardly on the lever the sleeves will be forced firmly against the plate; and if the surfaces in contact are properly machined leakage of the gas will be prevented. In order to operate on both sides of the sleeves I provide a toggle joint on each side of the sleeves.

In order to properly operate the toggle joint I provide for each of the joints a link 21 which is pivoted to the outer end of the lever 20 and to a second lever 22 which, in turn, is pivoted to the sleeve 13 by means of a bracket 23. The free end of one of the levers 22 carries a pivoted nut 24 into which is threaded a screw shaft 25. The free end of the other lever 22 carries a pivoted journal 26 in which the other end of the shaft 25 is journaled. By rotating the shaft 25 it is evident that the outer ends of the levers 22 will be separated or drawn together, depending upon the direction of rotation; and the sleeves will be separated or forced firmly together as the case may be.

Any suitable means may be used for operating the shaft 25. Inasmuch as these gas valves are frequently located in some inaccessible point, I provide for operating means the worm wheel 28 and the worm 29 meshing therewith, and the chain wheel 30 fixed to the worm. This wheel 30 carries a chain 31 which reaches downwardly, or elsewhere to some convenient point. By operating the worm wheel by means of this chain a powerful force may be applied to the toggles tending to operate the sleeve as desired, and when the sleeves are forced together, the worm will prevent their separation. In order to manipulate when desired the valve plate, I connect at its upper end and lower end, a cable 32 which passes upwardly over a pulley 33, and downwardly or elsewhere adjacent the chain 31, so that when the chain is operated to separate the sleeves the valve may be shifted upwardly or downwardly as desired. In this manner the operator may be at such a distance from the valve as to be unaffected by any slight amount of gas as may escape when the valve is being operated.

To prevent any sticking of the valve plate to either of the sleeves when the sleeves are separated, any convenient means may be provided which will force the plate away from the sleeves as the sleeves are separated. I prefer for this purpose the lugs 34 which are positioned on opposite sides of the plate, and are fixed to the lever 20. The position of these lugs is such that as the outer end of the lever 20 is elevated the right hand lug will force the plate away from the sleeve 14 and the left hand lug will prevent the sleeve clinging to and following the sleeve 13; it being understood that the lugs are spaced sufficiently to prevent any binding tendency of the plate. Also a stop 35 is provided to prevent the operator from forcing the toggle joint too far upwardly.

In order to prevent any shearing tendency of the ends of the sleeves, and thus to keep the sleeve bores registering properly, any suitable means may be used. I prefer for the purpose the wings 36 which comprise pairs of sheets of flexible sheet steel, one member of each pair being fixed to each of the sleeves, and the outer ends of the wings being connected in any suitable manner, such as by means of the rivets 37. As the sleeves are separated these wings will not materially hinder the operation, at the same time they will prevent any displacement of the two ends of the sleeves; and being spaced apart sufficiently by the strips 38 they in no way interfere with the movement of the plate when the sleeves are properly separated, and they act as guides for the plate.

I claim as my invention:

1. A valve comprising a perforated plate, and two substantially coaxial sleeves on opposite sides of said plate, and single means for forcing the adjacent ends of said sleeves longitudinally toward or away from each other.

2. A valve comprising a perforated plate, and two substantially coaxial sleeves on opposite sides of said plate, single means for forcing the adjacent ends of said sleeves toward or away from each other, and means for preventing said plate from sticking to either of said sleeves when said sleeves are forced apart.

3. A valve comprising a perforated plate, and two substantially coaxial sleeves on opposite sides of said plate, and means for forcing the adjacent ends of said sleeves toward or away from each other, and flexible means for holding said sleeves in their coaxial relation when they are moved relatively longitudinally.

4. A valve comprising a perforated plate, and two substantially coaxial sleeves on opposite sides of said plate, and means for forcing the adjacent ends of said sleeves toward or away from each other, and means for sliding said plate between said ends, both of said means being operable at a distance.

5. A goggle valve comprising two sleeves, and a perforated plate slidably mounted between two adjacent ends of said sleeve, and means operable at a distance for separating said sleeves and for forcing them toward said plate.

6. A goggle valve comprising two sleeves, and a perforated plate slidably mounted between two adjacent ends of said sleeve, means for separating said sleeves and for forcing them toward said plate, said means comprising a toggle joint, one member of said joint being fixed to each of said sleeves, and means for operating said joint.

7. In a gas distributing system a sleeve, a link pivoted to said sleeve, a second sleeve, a lever pivoted to said sleeve and to said link, a perforated plate positioned between adjacent ends of said sleeves, and means for operating said lever, whereby said adjacent sleeve ends may be forced against said plate.

8. In a gas distributing system a sleeve, a link pivoted to said sleeve, a second sleeve, a lever pivoted to said sleeve and to said link, a perforated plate positioned between adjacent ends of said sleeves, and means for operating said lever, whereby said adjacent sleeve ends may be forced against said plate, and a lug fixed to said lever on each side of said plate, whereby said plate is separated from said sleeve ends when said sleeves are separated.

9. A goggle valve comprising two pipes with adjacent ends, and a perforated plate slidably mounted between said ends, means operable at a distance for sliding said plates, and means for preventing said plate from sticking to said ends when they are moved apart.

10. A valve comprising two substantially coaxial pipes, a perforated plate positioned between the adjacent ends of said pipes, means operable at a distance for separating said pipes, and means for maintaining the coaxial relation of said pipes when they are moved relatively otherwise.

11. A valve comprising two substantially coaxial pipes, a perforated plate positioned between the adjacent ends of said pipes, and means for maintaining the coaxial relation of said pipes when they are moved relatively otherwise, said means comprising a flexible wing fixed to each of said pipes, the outer ends of said wings being adjacent, and being relatively immovable.

12. A goggle valve comprising two sleeves, and a perforated plate slidably mounted between two adjacent ends of said sleeve, means for separating said sleeves and for forcing them toward said plate, said means comprising a toggle joint, one member of said joint being fixed to each of said sleeves, and means for operating said joint comprising a worm and screw.

13. A goggle valve comprising two sleeves, and a perforated plate slidably mounted between two adjacent ends of said sleeve, and means for separating said sleeves and for forcing them toward said plate, said means comprising a worm gear.

14. A valve comprising two sleeves and a perforated plate slidably mounted between two adjacent ends of said sleeves, in combination with means mounted on opposite sides of said adjacent ends for separating said ends, and single means for operating both of said separating means.

In testimony whereof I hereunto set my hand.

GRANT D. BRADSHAW.